United States Patent [19]

Mentink et al.

[11] Patent Number: 5,314,701

[45] Date of Patent: May 24, 1994

[54] SUGAR-FREE "HARD CANDY" AND PROCESS FOR ITS MANUFACTURE

[75] Inventors: Léon Mentink, Estaires; Michel Serpelloni, Beuvry-les-Bethune, both of France

[73] Assignee: Roquette Freres, France

[21] Appl. No.: 896,004

[22] Filed: Jun. 11, 1992

[30] Foreign Application Priority Data

Jun. 14, 1991 [FR] France ............................... 91 07330

[51] Int. Cl.$^5$ ............................................... A23G 3/00
[52] U.S. Cl. .................................... 426/103; 426/660
[58] Field of Search ........................ 426/660, 103, 658

[56] References Cited

U.S. PATENT DOCUMENTS

| | | | |
|---|---|---|---|
| 4,497,846 | 2/1985 | Boursier et al. | 426/660 |
| 4,517,205 | 5/1985 | Aldrich | 426/103 |
| 4,623,543 | 11/1986 | Motegi et al. | 426/103 |
| 4,753,790 | 6/1988 | Silva et al. | 426/103 X |
| 4,840,797 | 6/1989 | Boursier | 426/103 |

FOREIGN PATENT DOCUMENTS 52-21585 2/1977 Japan .
2079129 1/1982 United Kingdom .

OTHER PUBLICATIONS

Extract C88–100686, in lieu of JP 63 160,553 of Jul. 4, 1988.
Leatherhead Food R.A., Report No. 652, Jun. 1989.
Chemical Patents Index, Basic Abstracts (JP 3 058 750) Mar. 1991.

Primary Examiner—Jeanette Hunter
Attorney, Agent, or Firm—Larson and Taylor

[57] ABSTRACT

The subject of the present invention is a sugar-free hard candy and a process which allows the manufacture of this candy. The sugar-free hard candy in accordance with the invention has a multilayer structure in which the external layer represents at most 35% of the candy, the said external layer consisting of at least two components A and B, component A being chosen from hydrogenated starch hydrolysates, xylitol, polymers of low-calorie saccharides or mixtures thereof, and component B being a weakly hygroscopic product.

10 Claims, No Drawings

SUGAR-FREE "HARD CANDY" AND PROCESS FOR ITS MANUFACTURE

The subject of the present invention is a sugar-free "hard candy" and a process which allows the manufacture of this candy.

The expression "hard candy" denotes, in the confectionery field, hard and amorphous candies which are well known to the consumer and which possess a brittle consistency and a glassy appearance.

The conventional "hard candies" are usually amorphous and consist of a mixture of sucrose and of glucose syrup, dehydrated by cooking, optionally under vacuum. In the case of candies of the sugar-free "hard candy" type and always conventionally, the mixture of sucrose and of glucose syrup has been replaced by sorbitol syrups which optionally contain mannitol and, more recently, by hydrogenated starch hydrolysates.

The candies manufactured using sorbitol syrups which optionally contain mannitol are crystallized products which have two major disadvantages, namely:
- the long time delays necessary to obtain crystallization of the sorbitol and to achieve complete hardening, which hinders the continuous operation of the manufacturing plants,
- crystallization phenomena due to the high proportion of sorbitol of the syrups in question.

Further, due to the fluidity of the cooked mass, the manufacture of these candies requires recourse to be made to a easting in molds process, while warm (approximately 120° C.), of the sugar-free hard candy mass while, in the case of conventional "hard candies", it is also possible to proceed by cutting from a roll, the constituent hard candy of which is cooled to approximately 70° C.-80° C.

To improve the quality of these candies, the manufacturers of sugar-free "hard candies" have proposed the addition of gum arabic to the mixtures of sorbitol/mannitol, the gum arabic having the role of delaying or inhibiting the recrystallization of the sorbitol.

The use, for the manufacture of sugar-free "hard candies", of hydrogenated starch hydrolysates in place of sorbitol syrups has allowed the recourse to gum arabic to be abandoned, the candies thus manufactured not exhibiting crystallization phenomena and requiring only notably reduced hardening times.

Furthermore, the manufacture of sugar-free "hard candies" obtained using these hydrolysates is very similar to that of the conventional "hard candies", thus making shaping possible by casting in molds as much as by cutting from a roll.

The first hydrogenated starch hydrolysates which were proposed in practice were those obtained from starch hydrolysates with a dextrose equivalent (DE) of 30 to 40.

The candies obtained from these hydrolysates effectively exhibit a total amorphous state, are not sensitive to crystallization, without it being necessary to have recourse to additions of gum arabic, and thus always retain a glassy appearance.

These hydrolysates, however, are not free of disadvantages. Indeed, on the one hand, they are only slightly sweet, thus requiring recourse to artificial sweeteners such as the saccharinates or the cyclamates or aspartame and, on the other hand, show a cariogenic character which is not negligible.

The first of these disadvantages has been able to be removed by recourse to hydrogenated starch hydrolysates obtained from starch hydrolysates with a higher DE, of between 42 to 60.

The second was more recently removed by virtue of the employment of hydrogenated starch hydrolysates furthermore containing a proportion of less than 3%, preferably of less than 1.5%, of polyols with a degree of polymerization (or DP) higher than 20.

The sugar-free "hard candies" based on these hydrogenated starch hydrolysates thus no longer exhibit the disadvantages of the sugar-free "hard candies" based on earlier hydrolysates.

Other disadvantages, however, are attached to the employment of hydrogenated starch hydrolysates obtained by hydrogenation of starch hydrolysates which exhibit a DE of 42 to 60.

The first of these disadvantages lies in a phenomenon of flow or of creep ("cold flow") which originates from the constituent material of the candy, this phenomenon, which is fairly slow at 20° C. but which accelerates with temperature rise, being expressed in the long term by a deformation of the candies, prejudicial to their marketing.

The second disadvantage lies in the non-negligible hygroscopic character of these candies, due to the fact that confectionery products based on these hydrogenated starch hydrolysates must be brought to a water content lower than 2%, preferably lower than approximately 1%, which leads to a tendency to resorb water on storage.

The cold-flow phenomenon can be greatly alleviated by lowering the residual moisture content of the candy to a value lower than approximately 1%, but this reduction is very difficult to carry out on the industrial scale and leads, in any case, to a very noticeable worsening of the hygroscopic character of the candy, the latter exhibiting from this fact a very strong tendency to stick to the wrapping paper.

None of the solutions mentioned has allowed the two disadvantages mentioned above to be simultaneously remedied, with, up to the present, the alleviation of one resulting in the magnification of the other, the technologists thus having been reduced up to the present to being satisfied with a compromise between the two.

It was then proposed in a process described in European Patent No. 94 292, on behalf of the Applicant Company, to jointly alleviate the two disadvantages in question by incorporating with the constituent hydrogenated starch hydrolysate of the sugar-free "hard candy" an effective quantity of gum arabic or of carboxymethylcellulose, or CMC.

In this patent, it is recommended to incorporate mannitol, in certain cases, with the constituent hydrogenated starch hydrolysate of the sugar-free "hard candy", so as to again reduce the tendency of the finished candy to resorb water and thus its propensity to be sticky.

However, if it is true that this composition of cooked sugar candy based on hydrogenated starch hydrolysate (HSH) and on CMC and/or on gum arabic and optionally on mannitol was satisfactory at the level of water resorption, creep and taste and organoleptic properties, it nevertheless remains the case that it can still be improved, especially concerning the optimization of the manufacturing process. It would in particular be advantageous to further reduce the temperatures and the cooking times and consequently the energy consumption. Furthermore, the use of products such as gum arabic or CMC, of viscous character in solution, can sometimes make difficult, on the one hand, the application of a vacuum due to a tendency to foam, and, on the other hand, the dehydration of the cooked mass.

In the context of the development of this technology of "hard candies" based on polyols, it was proposed to use HSH syrups with a high content of maltitol, optionally with maltitol powder added. In this type of candy, a crystallization of the maltitol is produced which, at first, slows down the resorption of water. On the other hand, subsequently, the candy resorbs water and develops rapidly towards a dull and opaque appearance which does not correspond to the required standards for a "hard candy". This phenomenon, called graining, can also be reduced by the employment of gum arabic and/or of CMC.

This disadvantage which the resorption of water constitutes is, as was seen above, connected to the final water content of the candy but also to the hygroscopic character of the constituents. However, generally speaking, the polyols, including especially the HSHs, particularly as a result of the sorbitol and maltitol which enter into their composition, xylitol and the condensation polymers of glucose, are known to exhibit this hygroscopic character.

Japanese Patent Application No. 63-160,553 of the 24/12/86 describes a process for preparing sorbitol confectioneries which consists in filling the shaping molds with a molten mass of sorbitol, resulting from the melting of sorbitol or from a solution of sorbitol, and then in coating the surface of it with a mixture of sugar and glucose syrup cooked at 150° C. The openings of the shaping molds are then closed up using a sealed plastic film. This is a cariogenic confectionery which is composed of sugars in addition to sorbitol and which requires to be packaged in protective "blisters", impermeable to water. The problems of water stability are, in this case, solved by expensive packaging means. Finally, it is not possible to consider that these candies consist solely of amorphous cooked sugar for, as was seen hereinabove, sorbitol necessarily passes to the grainy crystalline state on hardening.

Candies are also known which are based on HSH syrup or on isomalt or PALATINIT—registered tradename of the company Suddeutsche Zucker GmbH. Isomalt is an equimolecular mixture of glucosido-1-6-mannitol and isomaltitol, obtained by hydrogenation of isomaltulose originating from an enzymatic conversion of sucrose.

These HSH/isomalt candies were described especially by the Leatherhead Food R. A. in its report No. 652, page 11, of June 1989 (authors: GA Hammond and J. B. Hudson). The HSH/isomalt relative concentrations used are 1.07/1 (52/48). The combination of these two products has, certainly, allowed a slight improvement in the manufacturing conditions and in limiting the resorption of water by the candies obtained, especially as a result of the weakly hygroscopic character of the isomalt, but has led to a significant increase in the cost price of the candy and a very noticeable loss in sweetening power.

Isomalt is indeed an expensive product and owing to this fact is badly suited as a filling agent for products manufactured in large quantities. Moreover, its weak sweetening power necessitates recourse to powerful sweeteners such as aspartame, known to be degraded by heat into products with bitter and unpleasant flavors.

Bearing in mind that, in order to solve these problems of stability to heat and of water resorption, it was perhaps judicious not to take an interest solely in the nature of the essential constituents of the "hard candies" based on polyols, the Applicant has worked on a "hard candy" based on polyols which has a multilayer structure.

Such a structure is well known in many confectionery fields and yet there exists to this day no publication relating to its use in candies based on polyols and consisting exclusively of "hard candy".

A candy is known, for example, composed of, at a level of 5 to 50% by weight, a liquid center of the fondant or liqueur type, coated with a "hard candy" covering consisting of sucrose (45 to 70%) and glucose syrup (30 to 50%) representing 50 to 95% by weight of the candy (cf. U.S. Pat. No. 4,517,205).

Japanese Patent Application No. 52-21,585 describes, for its part, a process for preparing a sugar-free candy comprising a core consisting, for example, of fructose, sorbitol and maltitol, and an external covering based on a hydrogenated oligosaccharide, sorbitol and mannitol. These are not "hard candies" in the strict sense of the term, but are crystallized products.

This technology applied in the field of candies based on polyols poses entirely specific problems to which it is not possible to find solutions by taking inspiration from the technology of traditional candies. This is explained in particular by the fact that the HSHs used particularly for their ability to provide an appropriate viscosity as well as for their anticrystallizing and sweetening powers are in general hygroscopic.

It is as the result of a very great number of tests that the Applicant Company has come to perfect a sugar-free "hard candy" which exhibits an advantageous compromise, as far as manufacture and functional and organoleptic properties are concerned, between structural characteristics, namely a multilayer organization in which the external layer represents less than 35% by weight of the finished product, and characteristics relating to the nature of the constituents of this external layer. In accordance with the invention, the latter comprises indeed a first hygroscopic component chosen from the following products: hydrogenated starch hydrolysates, xylitol, polymers of low-calorie saccharides or mixtures thereof, at a concentration of between 5 and 92% by dry weight, and a second non-hygroscopic component B, at a concentration of between 8 and 95% by dry weight, this component having a solubility in water of less than 60 g per 100 g of water at a temperature of 20° C. and a hygroscopicity in the crystalline form such that this component should only resorb less than 3% of its weight of water in an atmosphere whose relative humidity is less than or equal to 85%, at a temperature of 20° C.

It follows that the sugar-free "hard candy" in accordance with the invention is distinguished by the fact that it has a multilayer structure in which the external layer represents at most 35%, preferably at most 20% of the candy, and by the fact that said external layer consists of at least two components A and B, component A being present in a proportion of 5 to 92% by dry weight and being chosen from the following products: hydrogenated starch hydrolysates, xylitol, polymers of low-calorie saccharides or mixtures thereof, and component B being present in a proportion of 8 to 95% by dry weight and having a solubility in water of less than 60 g per 100 g of water at 20° C. and a hygroscopicity in the crystalline form such that it should only resorb less than 3% of its weight in an atmosphere whose relative humidity is less than or equal to 85%, at 20° C.

The sparingly soluble component B is thus a product which crystallizes easily in a form which has very little hygroscopicity, if judged by its weak propensity to resorb water at relative humidities (RH) less than or equal to 85%.

Preferably, component B, which is much less hygroscopic than component A, is chosen from the following products: hydrogenated isomaltulose or isomalt, isomaltulose, mannitol or erythritol.

In the meaning of the present invention, the term "hydrogenated starch hydrolysate" denotes any product or any mixture of products originating from the hydrolysis of a starch of any nature, by a chemical or enzymatic route, then converted to polyols by hydrogenation.

It can be, for example, either sorbitol, maltitol or maltotriitol or a mixture thereof, or a mixture of hydrogenated mono-, oligo- and polysaccharides such as the product marketed by the Applicant under the tradename LYCASIN.

In accordance with the invention, polymers of low-calorie saccharides can be chosen from polymers of glucose and fructose, gums and vegetable fibers which are nonassimilable by the body.

Regarding glucose polymers, it is possible to mention the glucose condensation polymer developed and marketed by the company Pfizer, under the tradename LITESSE.

Concerning fructose, the fructooligosaccharides (neosugars), including in particular the product marketed under the tradename ACTILIGHT by the company Beghin Say, are suitable for the manufacture of candies in accordance with the invention.

Isomaltulose is a disaccharide of the glucosido-(1→6)-fructose type marketed under the registered tradename PALATINOSE by the company Suddeutsche Zucker GmbH.

Mannitol, for example, can be that marketed by the Applicant Company.

Many advantages are attached to the candy in accordance with the invention. First of all, it is necessary to underline the fact that its cost price is entirely moderated, it being given that the nonhygroscopic component B which is the most costly is only present at a limited concentration in relation to the weight of the candy.

Considering the technology of manufacture, it is to be noted that the addition of compound A to compound B, for the external composition, makes it possible to prevent the crystallization of compound B during manufacture, especially at the time of cooking, and to avoid the graining of the candies during storing.

Moreover, the candy obtained has a very good thermal stability, at the very least equivalent to that of the HSH/isomalt candies of the prior art. The temperature at which the creep (or cold flow) phenomenon appears on the candies in accordance with the invention is distinctly higher than that of candies of homogeneous, single-cast structure.

Furthermore, their shaping temperature, that is to say the temperature at which the cooked mass of candy can be shaped without the problem of an excessively weak viscosity, is generally greater than that of the candies of homogeneous, single-cast structure. This advantage can have advantageous practical repercussions, including in particular significant gains in manufacturing times.

Concerning their behavior with respect to water, it is noted that these candies have very little hygroscopicity. Their novel characteristics have made it possible to attain, without drastic manufacturing constraints, residual water contents higher than 1% by weight, especially of between 1 and 3% by weight, which further limits the manufacturing costs.

The invention also makes it possible, in contrast to the prior art, to introduce significant levels of substances judged up till then to be too hygroscopic to be used in the manufacture of hard candies and which nevertheless are endowed with advantageous properties. This is the case, for example, with xylitol which has a high sweetening power as well as anticaries properties.

Endowed with this advantage, the candies do not have a tendency to become sticky on storing. It is thus not necessary to provide packaging which is completely impermeable to water, thereby producing a saving in their cost price.

These "hard candies" have an entirely satisfactory sweet flavor which does not inevitably necessitate the use of powerful sweeteners. Their taste and organoleptic qualities are excellent.

In accordance with an advantageous method of using the invention, component A is a hydrogenated starch hydrolysate comprising preferably more than 30% by dry weight of molecules having a degree of polymerization or DP equal to 2.

Among the HSH syrups which can be used in the context of the invention, it is possible to mention those prepared from starch hydrolysates having a DE of 42 to 60, preferably from 45 to 55, and moreover having, the contents being expressed in relation to the dry matter of the hydrolysate,
  a sorbitol content of 0.1 to 19%, preferably from 0.2 to 17%,
  a maltitol content of 35 to 90%,
the complement to 100 consisting of polyols with a degree of polymerization greater than 2.

It is thus advantageous to resort:
  to HSHs comprising, in relation to their dry matter:
    from 2 to 10% by weight of molecules with a DP equal to 1,
    from 70 to 90% by weight of molecules with a DP equal to 2,
    from 7 to 24% by weight of molecules with a DP greater than 2.
  or else to HSHs comprising in relation to their dry matter:
    from 1 to 17% by weight of molecules with a DP equal to 1,
    from 35 to 75% by weight of molecules with a DP equal to 2,
    from 10 to 30% by weight of molecules with a DP ranging from 3 to 6,
    from 5 to 25% by weight of molecules with a DP ranging from 7 to 20,
  the complement to 100 consisting of hydrogenated polysaccharides with a DP>20.

These last two types of syrup have the notable advantage of being noncariogenic.

Following a variant of production of the candy in accordance with the invention, the external layer of the candy comprises:
  component A in a concentration of between 10 and 30%, preferably between 15 and 25% by dry weight, and component B in a concentration of between 70 and 90%, preferably between 75% and 85% by dry weight.

Following another advantageous embodiment of the invention, the sugar-free "hard candies" in accordance with the invention consist of a center and of an external layer which represent respectively 70 to 95% by weight and 5 to 30% by weight of the candy.

The center preferably consists of a hydrogenated starch hydrolysate, for example of the same type as those which could be chosen as component A for the external layer, or of xylitol, of polymers of low-calorie saccharides or of a mixture thereof.

The "hard candy" according to the invention can advantageously be with flavors and/or colorants and/or powerful sweeteners such as aspartame added.

The present invention also relates to a process for preparing "hard candy" with a multilayer structure in which the external layer represents at most 35% by weight of the candy and consists of at least two components A and B, component A being present in a proportion of 5 to 92% by dry weight and being chosen from the list of the following products: hydrogenated starch hydrolysates, xylitol or polymers of low-calorie saccharides or their mixtures, component B being present in a proportion of 8 to 95% by dry weight and having a solubility in water of less than 60 g per 100 g of water at 20° C. and a hygroscopicity in the crystalline form such that it should only resorb less than 3% of its weight of water in an atmosphere whose relative humidity is less than or equal to 85% at 20° C.

This process consists essentially:
- in preparing separately mixtures which each comprise the constituent(s) of one of the layers of the candy, optionally with addition of water, including in particular the mixture of component A and component B of the external layer, in quantities chosen such that their proportions in the external layer of the candy should be respectively from 5 to 92% by dry weight and from 8 to 95% by dry weight,
- in separately cooking each of the mixtures at temperatures higher than 120° C., under vacuum, so that the candy exhibits a hard and brittle consistency and a glassy appearance at room temperature,
- optionally in flavoring and/or in coloring,
- and finally in shaping the candy, so as to obtain a multilayer structure.

Following a preferential method of using the process according to the invention, the cooking of the different layers of the candy is carried out at approximately 155° C. under a minimum vacuum of −0.6 bar until the moisture content of the mixture should be brought to a value less than approximately 3% by weight, especially from 3 to 1% by weight.

At least two separate cookings are thus resorted to. This can, for example, involve a continuous cooking for the center of the candy and a discontinuous cooking for the upper layer(s).

The shaping of the multilayer candy following the invention is carried out by shaping the core of the candy and by coating said center with the layer(s) of the candy.

In accordance with a first technique for shaping and in the case of a structure with two layers, the cooked mass of candy intended to form the center is brought to a temperature for shaping of between 60 and 90° C. It is worked manually to give a cylindrical roll around which the cooked mass of the upper layer, previously shaped into a film at a shaping temperature of between 60° and 90° C., is wound.

For obvious practical reasons, the candy will, in general, only be formed from one center and from one external layer.

A second technique for shaping can be the shaping with the help of devices widely used in this field, such as, for example, rolling devices made up of four rotating frustoconical rollers which operate such that there should be made an interstitial space between them having a frustoconical general form, into which the cooked mass of the center of the candy is brought continuously in the form of a frustoconical roll around which is wound the cooked mass of the external layer introduced into the device downstream from the intended site for the cooked mass of the core, which is in general introduced at the head of the extruder.

In order to use this second technique, it is also possible to employ coextrusion devices equipped, like the rolling devices above, with an offset feeding system for the different cooked masses which form the center and the successive layer(s) of the candy.

Another technique which can be used to shape the candy is the casting in several runs of cooked masses into molds at temperatures higher than 90° C.

It is self-evident that the process according to the invention is not in the least limited to the shaping techniques described above, any other technique accessible to one skilled in the art of "hard candy" confectionery being equally suitable.

After shaping, optional cutting and cooling of the cooked masses, the candies obtained are packaged without it being necessary to have recourse to packaging which is impermeable to water, as a result of the existence of the external layer which has little hygroscopicity.

The manufacturing tests of the candies in accordance with the invention carried out by the Applicant are described below, in the context of the examples, which make it possible to illustrate the products and the process concerned by the present invention and to make their different advantages emerge from them.

They were carried out according to the methodology and under the conditions which follow:
- separate mixing of the constituents of the center and of components A and B of the external layer, with optional addition of water,
- cooking of the constituents of the center in a first cooker of the Otto Hansel Sucroliner tradename which operates in a continuous mode with a cooking temperature of 140° C. under a vacuum of −0.9 bar,
- cooking of components A and B in a second cooker of the Bosch tradename which operates in a discontinuous mode, the cooking being carried out at a temperature of the order of 155° C. under a vacuum of −0.7 bar for 5 minutes,
- flavoring and coloring,
- cooling of the cooked masses of the center on a conveyor belt and of the external layer on a cold table to their shaping temperature, approximately 80° C.,
- shaping of the cooled cooked masses consisting, in fact, in continuously conveying the cooked mass of the center into a rolling device, or extruder, of the Uniplast trademark from Bosch, while the cooked mass of the external layer is introduced into the upper part of the extruder at a place distant from the head of the device, so as to obtain, at the exit of the device, a roll with two layers, cutting of the said roll into candies, passage of the candies obtained through a cooling line.

EXAMPLE I

Starting composition

For the center: hydrogenated starch hydrolysate syrup marketed under the registered tradename LYCASIN 80/55, clear, colorless, with a sweet flavor and non-cariogenic, whose dry matter content is 75% by weight and whose glucidic spectrum is the following:

| | |
|---|---|
| D-sorbitol | 7.7% |
| hydrogenated disaccharides | 53.0% |
| hydrogenated tri- to hexasaccharides | 24.9% |
| DP7 to DP20 hydrogenated saccharides | 13.5% |
| DP > 20 hydrogenated saccharides | 0.9% (3% max.) |

For the external layer:

component A = LYCASIN maltitol syrup defined above, component B = product marketed under the tradename PALATINIT, in powder form, water.

The proportions A/B/water of the external layer are respectively 1/4.5/1.

Final characteristics

The "hard candies" obtained in accordance with the methodology described above have an external layer which forms approximately 20% by weight of the candy and surrounds a center which forms the remaining approximately 80% by weight. The external layer comprises:

85% by dry weight of PALATINIT, and 15% by dry weight of LYCASIN.

The candies finally contain approximately:

82% by weight of LYCASIN,

16% by weight of PALATINIT,

2% by weight of water.

These candies exhibit a good stability to moisture, that is to say that they have a low tendency to resorb water on storage, and a high thermal stability since no creep is observed at a temperature less than 40° C. It is also noted that they have an entirely satisfactory sweet flavor without any contribution from powerful sweeteners, and that they are not cariogenic.

These candies do not need to be individually wrapped and can be marketed in cardboard boxes.

All these advantages were obtained without any particular manufacturing difficulties and without any negative consequences regarding the cost price. Better still, the latter was reduced by a third in relation to that of known sugar-free "hard candies" of homogeneous structure with LYCASIN and PALATINIT.

EXAMPLE II

Starting composition

The ingredients employed are the following:

For the center: maltitol syrup marketed under the registered tradename MALTISORB 75/75 by the Applicant Company, clear, colorless, noncariogenic and with a sweet flavor close to that of sucrose, whose dry matter content is 75.7% by weight and whose glucidic spectrum is (in % of dry matter):

| | |
|---|---|
| D-sorbitol | 5.1% |
| hydrogenated disaccharides | 77.4% |
| DP > 2 hydrogenated saccharides | 18.5% |

For the external layer:

component A = MALTISORB syrup defined above, component B = PALATINIT in powder form, water.

The proportions A/B/water of the external layer are respectively 1/4.5/1.

Final characteristics

The "hard candies" obtained in accordance with the methodology described above have an external layer which forms approximately 20% by weight of the candy and which surrounds a center which forms the remaining approximately 80% by weight. The external layer comprises:

85% by dry weight of PALATINIT and 15% by dry weight of MALTISORB.

The candies finally contain approximately:

82% by weight of MALTISORB

16% by weight of PALATINIT

2% by weight of water.

These candies exhibit the same advantages as those obtained in Example I, with an even higher sweetening power.

EXAMPLE III

Starting composition

The ingredients employed are the following:

for the center: LYCASIN syrup employed in Example I, for the external layer:

component A = LYCASIN syrup, component B = mannitol powder marketed by the Applicant Company, gum arabic.

The proportions A/B/gum arabic of the external layer are respectively 80/18/2.

Final characteristics

The "hard candies" obtained in accordance with the methodology described above have an external layer which forms approximately 25% by weight of the candy and surrounds a center which forms the remaining approximately 75% by weight. The external layer comprises on a dry basis:

80% by dry weight of LYCASIN,

18% by dry weight of mannitol,

2% by dry weight of gum arabic.

The candies finally contain approximately:

93.0% by weight of LYCASIN 4.5% by weight of mannitol 0.5% of gum arabic

2% of water.

The joint use of LYCASIN, of mannitol and of gum arabic in the external layer confers a very weak hygroscopicity on the candy, thus preventing water resorption, as well as a good thermal stability which gives it an excellent resistance to creep (cold flow). Overall, this leads to a notable improvement in the stability and in the preservation on storage of the candies according to the invention.

We claim:

1. A sugar-free hard candy, which has a double layer structure in which the external layer represents at most 35% by weight of the candy and wherein said external layer consists of at least two components A and B, component A being present in a proportion of 5 to 92% by dry weight and being selected from the group consisting of hydrogenated starch hydrolysates, xylitol, polymers of low-calorie saccharides and mixtures thereof, and component B being present in a proportion of 8 to 95% by dry weight and being selected from the group consisting of hydrogenated isomaltulose or isomalt, isomaltulose, mannitol, erythritol and mixtures thereof.

2. The hard candy according to claim 1, wherein the external layer represents at most 25% by weight of the candy.

3. The hard candy according to claim 1, wherein component A is a hdyrogenated starch hydrolysate which comprises more than 30% by dry weight of molecules which have a degree of polymerization equal to 2.

4. The hard candy according to claim 3, wherein the hydrogenated starch hydrolysate has, the contents being expressed in relation to the dry matter of the hydrolysate:
a sorbitol content of 0.1 to 19%, preferably from 0.2 to 17%,
and a maltitol content of 35 to 90%, the complement to 100 consisting of polyols with a DP greater than 2.

5. The hard candy according to claim 3, wherein the hydrogenated starch hydrolysate comprises, the contents being expressed in relation to the dry matter of the hydrolysate:
from 1 to 17% by weight of molecules with a DP equal to 1,
from 35 to 75% by weight of molecules with a DP equal to 2,
from 10 to 30% by weight of molecules with a DP ranging form 3 to 6,
from 5 to 25% by weight of molecules with a DP ranging from 7 to 20,
the complement to 100 consisting of hydrogenated polysaccharides with a DP>20.

6. The hard candy according to claim 1, wherein the external layer of the candy comprises:
component A in a concentration of between 10 and 30% by dry weight,
component B in a concentration of between 70 and 90% by dry weight.

7. The hard candy according to claim 1, wherein the external layer of the candy comprises:
component A in a concentration of between 15 and 25% by dry weight,
component B in a concentration of between 75 and 85% by dry weight.

8. The hard candy according to claim 1, which consists of a center and of an external layer which represent respectively from 70 to 95% by weight and from 5 to 30% by weight of the candy.

9. The hard candy according to claim 8, wherein the center of the candy consists of a hydrogenated starch hydrolysate, xylitol, a polymer of low calorie saccharides or a mixture thereof.

10. A process for preparing a hard candy with a double layer structure in which the external layer represents at most 35% by weight of the candy and consists of at least two components A and B, component A being present in a proportion of 5 to 92% by dry weight and being selected form the group consisting of hydrogenated starch hydrolysates, xylitol, polymers of low-calorie saccharides and mixtures thereof, component B being present in a proportion of 8 to 95% by dry weight and being selected from the group consisting of hdyrogenated isomaltulose or isomalt, isomaltulose, mannitol, erythritol and mixtures thereof, this process consisting essentially of:
preparing separately mixtures which each comprise the constituent(s) of a layer of the candy, optionally with addition of water, including in particular the mixture of component A and component B of the external layer in quantities chosen such that their proportions in the external layer of the candy should be respectively form 5 to 92% by dry weight and from 8 to 95% by dry weight,
separately cooking each of the mixtures at temperatures higher than 120° C., under vacuum, such that the candy exhibits a hard and brittle consistency and a glassy appearance at room temperature,
and finally shaping the candy, so as to obtain a double layer structure.

* * * * *

UNITED STATES PATENT AND TRADEMARK OFFICE
CERTIFICATE OF CORRECTION

PATENT NO. : 5,314,701
DATED : May 24, 1994
INVENTOR(S) : Leon Mentink, et al

It is certified that error appears in the above-identified patent and that said Letters Patent is hereby corrected as shown below:

Column 11, line 16 (Claim 3), delete "hdyrogenated" and insert --hydrogenated--.

Column 12, line 29 (Claim 10), delete "hdyrogenated" and insert --hydrogenated--.

Signed and Sealed this

Sixth Day of September, 1994

Attest:

BRUCE LEHMAN

Attesting Officer

Commissioner of Patents and Trademarks